US006207114B1

(12) United States Patent
Quinn et al.

(10) Patent No.: US 6,207,114 B1
(45) Date of Patent: Mar. 27, 2001

(54) REACTIVE MATERIAL PLACEMENT TECHNIQUE FOR GROUNDWATER TREATMENT

(75) Inventors: Jacqueline W. Quinn, Titusville; Christan A. Clausen, Orlando; Debra R. Reinhart, Maitland; Manoj B. Chopra, Oviedo, all of FL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/127,860

(22) Filed: Jul. 13, 1998

Related U.S. Application Data

(63) Continuation-in-part of application No. 08/904,028, filed on Aug. 31, 1997, now Pat. No. 6,013,232.

(60) Provisional application No. 60/060,494, filed on Sep. 30, 1997.

(51) Int. Cl.[7] ..................... C02F 1/70

(52) U.S. Cl. .................. 422/128; 210/747; 210/757; 210/170; 210/205; 175/19; 175/22; 175/64; 175/314

(58) Field of Search .................. 422/127, 128, 422/900; 210/747, 757, 170, 205; 166/249, 276, 278, 279, 280, 51, 52, 177.6, 227, 228; 405/128, 263, 133, 138; 175/19, 22, 64, 314

(56) References Cited

U.S. PATENT DOCUMENTS

| | | | | |
|---|---|---|---|---|
| 2,933,137 | * | 4/1960 | D'Audiffret et al. . | |
| 3,375,884 | * | 4/1968 | Bodine . | |
| 4,664,809 | * | 5/1987 | Fenton et al. . | |
| 4,832,122 | | 5/1989 | Corey et al. | 166/266 |
| 4,836,299 | * | 6/1989 | Bodine . | |
| 4,886,400 | * | 12/1989 | Taki et al. . | |
| 4,895,085 | | 1/1990 | Chips | 110/346 |
| 5,043,076 | | 8/1991 | Alexander | 210/679 |
| 5,057,227 | | 10/1991 | Cohen | 210/680 |
| 5,256,001 | | 10/1993 | Millgard | 405/128 |
| 5,256,264 | | 10/1993 | Hundenborn | 204/130 |
| 5,318,698 | | 6/1994 | Bernhardt | 210/150 |
| 5,398,756 | | 3/1995 | Brodsky et al. | 166/248 |
| 5,447,639 | * | 9/1995 | Sivavec . | |
| 5,487,622 | | 1/1996 | Cherry et al. | 405/128 |
| 5,509,760 | | 4/1996 | Schriefer et al. | 405/258 |
| 5,525,008 | | 6/1996 | Wilson | 405/128 |
| 5,570,973 | | 11/1996 | Hunt | 405/128 |
| 5,597,265 | | 1/1997 | Gallo | 405/128 |
| 5,611,642 | | 3/1997 | Wilson | 405/128 |
| 5,624,552 | | 4/1997 | Vales et al. | 210/170 |
| 5,750,036 | * | 5/1998 | Sivavek | 210/747 |
| 5,789,649 | * | 8/1998 | Batchelor et al. . | |
| 6,013,232 | * | 1/2000 | Quinn et al. . | |

* cited by examiner

*Primary Examiner*—William H. Beisner
(74) *Attorney, Agent, or Firm*—Diana M. Cox; Beth A. Vrioni; Gary G. Borda

(57) ABSTRACT

The invention provides a permeable treatment wall comprising one or more high-permeability columns, as well as a methods for preparing such a permeable treatment wall.

17 Claims, 2 Drawing Sheets

REACTIVE MATERIAL PLACEMENT TECHNIQUE FOR GROUNDWATER TREATMENT

PRIORITY OF INVENTION

This application claims priority of invention under 35 U.S.C. §119(e) from U.S. Provisional Patent Application Number 60/060,494, filed Sept. 30, 1997; and this application is a continuation in part of U.S. patent application Ser. No. 08/904,028, filed Aug. 31, 1997, now U.S. Pat. No. 6,013,232.

ORIGIN OF THE INVENTION

The invention described herein was made in performance of work under a NASA contract and is subject to the provisions of Public Law 96–517 (35 U.S.C. §202) in which the contractor has elected not to retain title.

BACKGROUND OF THE INVENTION

Halogenated solvents are used by a wide range of industries including dry cleaners, electronic equipment manufacturers, metal parts fabricators, insecticide and herbicide producers, and military equipment manufacturers. These solvents replaced petroleum derived mineral spirits and have distinct advantages because of their non-flammability. The persistence and mobility of these hydrocarbons in the subsurface was largely unanticipated, therefore historical disposal practices have led to widespread groundwater contamination. For example, trichloroethylene has been found at more than 791 of 1300 National Priority List sites, primarily as a groundwater contaminant.

Chlorinated solvents fall into the category of dense non-aqueous phase liquids (DNAPLs). DNAPLs are heavier than water and therefore sink below the groundwater table until they encounter a layer through which they cannot pass. As they move downwards, DNAPLs leave behind a smearing trace on their migration pathway before eventually pooling on a confining unit or perhaps within a crevice of a fractured rock. Most DNAPLs can dissolve in aqueous environments, yet they do so in such small quantities that the original contaminant pool functions as a subsurface contamination source. The portion of the contaminant that does dissolve is typically at concentrations which exceed allowable groundwater standards.

Treatment of halogenated hydrocarbon contaminated groundwater is usually accomplished by pumping the groundwater to the surface and removing the contaminant through oxidation or air stripping. Pump-and-treat remediation systems have experienced limited success with DNAPLs. Capillary pressure holds DNAPLs at residual saturation which can represent significant contamination. Consequently, removal of the contaminant from the subsurface is extremely time consuming, and cleanup goals are rarely achieved.

Because of the limited degree of success in remediating contaminated sites with technologies which attempt to remove the contaminant from the subsurface and pump it to a treatment system, recent efforts have focused on the physical, biological, or chemical treatment of these contaminants in situ. A permeable treatment wall is an alternative remediation technology which does not require groundwater to be pumped to a treatment facility. (Gillham, R. W., and Burris, D. R., "Recent Developments in Permeable In Situ Treatment Walls for Remediation of Contaminated Groundwater," Proceedings of Subsurface Restoration Conference, Jun. 21–24 (1992)). Instead contaminated groundwater is passively treated in situ. Permeable treatment walls, as shown in FIG. 1, are installed subsurface near a contaminant source. The process is passive in nature since natural groundwater flow transports the contaminants through the wall. Permeable treatment walls have been successfully demonstrated in several field studies and offer potential economic savings over other treatment methods.

Permeable treatment walls are designed so that larger volumes of water pass through the permeable treatment wall than through the surrounding soils. As contaminated groundwater flows through a treatment wall, halogenated solvents are chemically altered to give acceptable alternative species. Emerging on the downstream side of the treatment wall is contaminant-free groundwater. No pumps or other above-ground treatment are required, as the natural groundwater gradient carries the contaminant through the treatment wall.

Permeable treatment walls can be constructed using a mixture of a zero valent metal and a high permeability bulking material (e.g. sand or gravel). Alternatively, a permeable treatment wall comprising pure zero valent metal can be used. A number of techniques have been used to construct permeable treatment walls, including: 1) excavation and backfilling, 2) slurry trenching, and 3) borehole augering.

Traditional excavation and backfilling can be relatively cheap and expeditious if the depth of the excavation is shallow. However, with deeper depths, the shoring of the trench's side walls becomes a safety issue and can significantly slow down the progress of the excavation. Also, when excavating contaminated wastes, the costs associated with the ultimate disposal of the removed soil can be prohibitive. As a result, the excavation and backfilling method may not be the most economical construction method for large permeable treatment walls.

Slurry trenching is most commonly used to construct deep, impervious walls below the subsurface. Typically, the walls are made of concrete and are intended to contain a migrating plume of contaminated water, or to divert groundwater away from a contaminant source. During construction of slurry walls, a liquid mixture of water and bentonite (the slurry) is typically placed in an open trench to support the trench walls. After excavation, a cement slurry is pumped into the trench to form a permanent wall.

When applying traditional slurry trenching construction techniques to permeable treatment walls, bentonite can not be used, because the bentonite filter cake creates an impermeable barrier that defeats the objective of a permeable treatment wall. However, natural, biodegradable polymers can be substituted for bentonite. Typically, the bio-polymer maintains an effective filter cake for two weeks before dissolving in water. Once dissolved, the walls of the trench no longer prohibit water from passing through the treatment cell.

Thus, the use of slurry trenching to construct a permeable treatment wall eliminates the time consuming process of installing side braces, which is typically required for the traditional excavation and backfilling method. Unfortunately, the excavated soil disposal cost for slurry trenching is also high. For civil engineering applications, both trenching techniques usually do not extend to depths beyond 10 m.

Borehole augering is used throughout the drilling industry for the installation of pumping and monitoring wells. As adapted for permeable treatment wall construction, this construction method involves augering to a design depth, filling the borehole through the hollow stem auger with a coarse sand and zero valent metal mixture before removing the auger and leaving the new treatment column behind. The disadvantage of this construction technique once again stems from the excavation of contaminated soil waste. On average, for a 14-inch outer diameter borehole, approximately one 55 gallon drum of contaminated soil is generated for each five feet of augering. Thus, the costs associated with this construction method may also be prohibitive.

There is a current need for improved methods for constructing permeable treatment walls. In particular, there is a need for more cost effective construction methods that produce smaller volumes of excavated soil, and for construction methods that provide treatment walls with higher permeability.

SUMMARY OF THE INVENTION

The invention provides a method comprising constructing a permeable treatment wall made of one or more columns by: inserting a member into soil where a column is to be located, to create a void; placing a zero-valent metal, sand, gravel, or a mixture thereof into the void; and decreasing soil density in an area including the void to define the column.

The invention also provides a permeable treatment wall comprising one or more high-permeability columns constructed by: inserting a member into soil where a column is to be located, to create a void; placing a zero-valent metal, sand, or gravel, or a mixture thereof into the void; and decreasing soil density in an area including the void to define the column.

The invention also provides a ground water treatment system comprising: a plurality of permeable columns vertically extending into the ground, the columns comprising a zero-valent metal, sand, or gravel, or a mixture thereof.

DETAILED DESCRIPTION OF THE INVENTION

Figure 1:
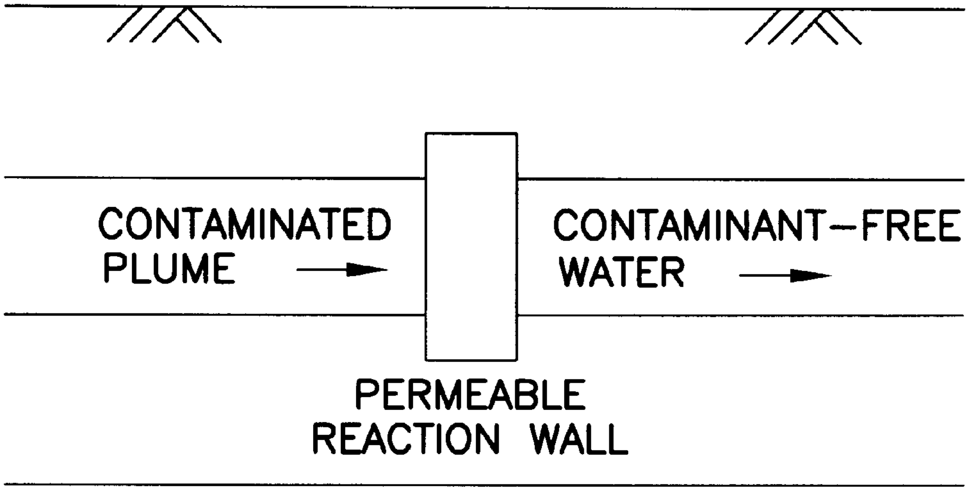
FIG. 1 illustrates a side view of an in situ permeable treatment wall.
Figure 2A:
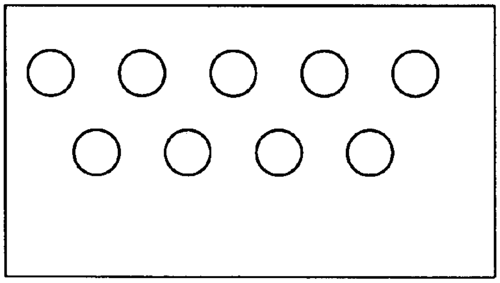
FIGS. 2*a*–2*d* illustrate potential permeable treatment wall column layouts.
Figure 2B:
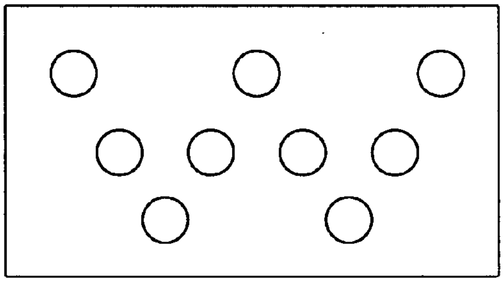
Figure 2C:
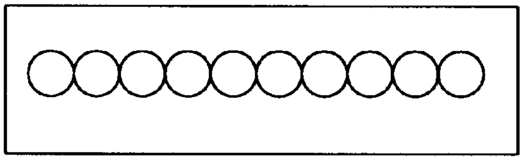
Figure 2D:
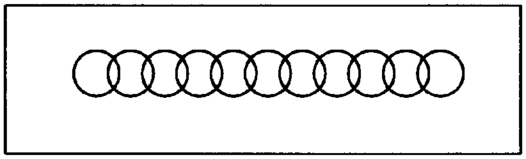

In the following detailed description of the preferred embodiments of the invention, reference is made to the accompanying figures which form a part hereof, and in which is shown by way of illustration specific embodiments in which the invention may be practiced. It is to be understood that other embodiments may be utilized and structural changes may be made without departing from the scope of the present invention.

The term "near" means a position adjacent to a permeable treatment wall or a column (e.g. upstream or downstream), and within a distance such that decreasing soil density produces a beneficial effect on the permeable treatment wall (e.g. increased permeability or water flow).

The term "reactive material" includes zero-valent metals, bulking material such as sand or gravel, as well as mixtures thereof.

In the environmental remediation field, deep soil mixing techniques have been used primarily for the construction of impermeable containment walls. Through the injection of a cement, bentonite, or lime-based slurry, a deep soil mixer can create impermeable columns ranging from 0.7 to 2.0-m in diameter (Bruce, Donald A. "The Return of Deep Soil Mixing," *Civil Engineering*, pp. 44–46 (1996)). Deep soil mixing utilizes a discontinuous flight, hollow stem auger that is guided into the subsurface by crane-supported steel leads. The auger's discontinuous flight mixes the soil without conveying the soil to the surface. The auger's hollow stem allows the injection of a slurry material that increases the soil's strength and decreases its permeability. This technology is advantageous since there is little or no disposal waste generated. In addition, there is minimal exposure to harmful contaminants for site personnel.

It has now been discovered that deep-soil mixing techniques can advantageously be applied to the construction of permeable treatment walls, particularly where sandy soils predominate. Instead of excavating soil down to design depths as required with previous permeable treatment wall construction techniques, deep soil mixing allows a permeable treatment wall to be prepared with either no excavation, or with significantly reduced excavation. When excavation is required, it is typically in the upper few feet of the subsurface where there is little chance of finding halogenated contaminants.

When deep soil mixing is used in the construction of a permeable treatment wall, the mixing augers blend the existing soils with zero valent metal shavings. Each mixed column of iron and native material then serves as a "pumpless well" drawing water into the column due to its higher hydraulic conductivity (i.e. permeability) relative to the surrounding soil. Thus, it is possible to construct a permeable treatment wall from a series of spaced columns instead of from a continuous wall of reactive material spanning the entire width of the flow field. As a result, the use of deep soil mixing can reduce the cost of materials and the installation costs for a permeable treatment wall.

Modeling

Groundwater modeling can be used to ensure adequate capture and retention of contaminated groundwater. Modeling can also be used to select the most appropriate construction method for a given field site based upon hydrogeologic conditions, lithology, or current land usage, as well as to estimate cost, effectiveness, and ease of construction. Accordingly, the construction methods of the invention can optionally further comprise modeling column number, shape, size, spacing, permeability, or how much zero-valent metal, sand, or gravel is necessary to provide effective groundwater decontamination. Such modeling can conveniently be carried out using a finite difference or finite element modeling technique.

Metals

Due to its relatively low cost, its ready availability, and its ease of handling, iron is the metal most frequently used in the construction of permeable treatment walls. A considerable amount of research has been conducted in order to define the kinetics of the chemical reactions responsible for reductive dehalogenation by zero-valent iron. In anoxic or anaerobic environments, the chemical reactions involved arc defined by corrosion chemistry, with the redox couple formed being:

$$Fe^0 \Leftrightarrow 2e^- + Fe^{+2} \qquad (1)$$

$Fe^0$ in this reaction functions as a reducing agent and is therefore capable of reductive dehalogenation of alkyl halides (RX).

$$RX+2e^{-}+H^{+}\rightarrow RH+X^{-} \qquad (2)$$

The combination of Equations 1 and 2 is thermodynamically favorable under most conditions:

$$Fe^{0}+RX+H^{+}\rightarrow Fe^{+2}+RH+X^{-} \qquad (3)$$

As illustrated by the following equations, water alone can serve as the oxidant in an anaerobic environment.

$$2H_2O+2e^{-}\Leftrightarrow H_2+2OH^{-} \qquad (4)$$

$$Fe^{0}+2H_2O\Leftrightarrow Fe^{+2}+H_2+2OH^{-} \qquad (5)$$

Although iron may be a preferred metal for use in the construction of permeable treatment walls, any metal or combination of metals having a redox potential such that the reduction of the halocarbon or other contaminate is thermodynamically favorable under given soil conditions is suitable. For example, other metals including palladium, magnesium, and zinc can be utilized in the construction of permeable treatment walls. Metal foams such as the iron foam available from Cercona of America Inc., Dayton Ohio, can also be utilized in the construction of permeable treatment walls.

Theoretical Background

Flow through the native soil and permeable treatment wall material is governed by three-dimensional continuity equations which reduce to the well-known Laplace equations under the conditions of homogeneous and isotropic soil flow properties. However, the truly three-dimensional flow conditions and an abrupt change in the permeability of the soil at the interface of the native soil and the permeable treatment wall creates additional complexity. The governing equations of each of the regions may be expressed as follows:

$$K_1\left(\frac{\partial^2\phi_1}{\partial x^2}+\frac{\partial^2\phi_1}{\partial y^2}+\frac{\partial^2\phi_1}{\partial z^2}\right)=0 \text{ in Native Soil} \qquad (6)$$

$$K_2\left(\frac{\partial^2\phi_2}{\partial x^2}+\frac{\partial^2\phi_2}{\partial y^2}+\frac{\partial^2\phi_2}{\partial z^2}\right)=0 \text{ in } PTW$$

subjected to the conditions:

$$\phi_1=\phi_2 \text{ on } C \qquad (7)$$

$$K_1\frac{\partial\phi_1}{\partial n}=K_2\frac{\partial\phi_2}{\partial n} \text{ on } C$$

where $\phi_1$ and $\phi_2$ are the potentials (heads) in the native soil and the wall respectively, C is the contour of the interface between the two regions, $K_1$ and $K_2$ are the isotropic permeability of the native soil and permeable treatment wall material respectively and n is the normal to the interface at the point of incidence. It is important to note, the permeability of the wall material must be sufficiently high compared to that of the native soil to capture all of the plume approaching the wall.

J. Bear *Hydraulics of Groundwater*, McGraw Hill, New York (1979) describes discontinuous permeability symbolically and indicates that the presence of a highly permeable zone embedded within a horizontal flow field will cause streamlines to bend towards this zone. However, it is not easy to obtain an analytical solution to this problem due to the abrupt change in flow properties described by the equations above. Instead, numerical solution techniques such as finite difference or finite element method can be used. A well-known finite difference computer program, VISUAL MODFLOW® (purchased from Waterloo Hydrogeologic Inc., Waterloo, Ontario, Canada), can conveniently be used to obtain a solution. This program is capable of modeling a complete three-dimensional flow field for multiple regions with anisotropic material-based flow properties. This program as well as other finite difference or finite element techniques can conveniently be used to develop design parameters for a permeable treatment wall such as column layout, spacing, and permeability ratios, in order to insure complete capture and decontamination.

Column Composition

Hydraulic conductivity is an important factor to consider when designing a permeable treatment wall, because it has a major effect on the pattern of streamline flow through columns. Constant head and falling head permeability tests were conducted in the laboratory in order to determine the proper mixture of various column ingredients. Native in-situ sand, iron chips, coarse sand (10/20) and gravel (well-graded and uniform) were mixed in different proportions to prepare samples for permeability tests. The results are presented in Table 1 below.

Samples 3 and 4 provide ratios of about 50 times the native material. The tests with iron chips, native sand and gravel alone (Samples 8 and 9) are inconclusive since the permeameter size used to conduct the laboratory tests does not accommodate large gravel-sized particles.

Using information about the particular soil conditions and in situ permeability at a proposed remediation site, one skilled in the art can determine the desired hydraulic conductivity ratio for the columns of a proposed permeable treatment wall. For example, columns prepared using the methods of the invention, may have conductivity ratios ($K_{col}/K_{in\text{-}situ}$) of greater than about 2; while conductivity ratios in the range of about 10 to about 75, or more particularly, about 20 to about 50 may be preferred in sandy soils.

TABLE 1

Permeability test results for suitable mixture of column materials

| Sample Number | | Iron Chips | Sand 10/20 | Sand 20/30 | Sand Native | Gravel Well Graded | Gravel 4/10 | avg. K (cm/sec) | ×K Native |
|---|---|---|---|---|---|---|---|---|---|
| 1 | weight (g.) | 160 | — | 320 | 320 | — | — | 6.92 E-3 | 19 times |
| | % weight | 20 | — | 40 | 40 | — | — | | |
| 2 | weight (g.) | 160 | — | 240 | 320 | 80 | — | 7.6 E-3 | 21 times |
| | % weight | 20 | — | 30 | 40 | 10 | — | | |
| 3 | weight (g.) | 160 | 320 | — | 320 | — | — | 2.08 E-2 | 58 times |
| | % weight | 20 | 40 | — | 40 | — | — | | |

TABLE 1-continued

Permeability test results for suitable mixture of column materials

| Sample Number | | Iron Chips | Sand 10/20 | Sand 20/30 | Sand Native | Gravel Well Graded | Gravel 4/10 | avg. K (cm/sec) | ×K Native |
|---|---|---|---|---|---|---|---|---|---|
| 4 | weight (g.) | 160 | 240 | — | 320 | 80 | — | 1.97 E-2 | 55 times |
| | % weight | 20 | 30 | — | 40 | 10 | — | | |
| 5 | weight (g.) | 160 | 240 | — | 320 | — | 80 | 1.45 E-2 | 40 times |
| | % weight | 20 | 30 | — | 40 | — | 10 | | |
| 6 | weight (g.) | 160 | 320 | — | 320 | — | — | 5.12 E-3 | 14 times |
| | % weight | 20 | 40 | — | 40 | — | — | | |
| 7 | weight (g.) | 140 | — | — | 385 | 175 | — | 4.9 E-3 | 14 times |
| | % weight | 20 | — | — | 55 | 25 | — | | |
| 8 | weight (g.) | 140 | — | — | 385 | 175 | — | 6.4 E-3 | 18 times |
| | % weight | 20 | — | — | 55 | 25 | — | | |
| 9 | weight (g.) | 140 | — | — | 455 | 105 | — | 7.8 E-3 | 22 times |
| | % weight | 20 | — | — | 65 | 15 | — | | |

Traditionally, permeable treatment walls have been prepared by excavation and backfilling, slurry trenching, and borehole augering. These construction techniques all require considerable soil excavation or soil removal. It has now been discovered that permeable treatment walls can be constructed by placing columns comprising a zero-valent metal in a contaminated flow field by a) inserting a member into soil where the column is to be located to create a void (e.g. using vibro-installation); b) placing a zero-valent metal, sand, or gravel, or a mixture thereof into the void; and c) optionally repeating steps a) and b) one or more times. This permeable treatment wall construction technique allows for placement of the reactive material, while reducing or eliminating the need for expensive soil excavation and removal.

The member described herein is used to create a suitable void in the soil so that the reactive material can be placed in the ground. Accordingly, the size and shape of the member as well as the material it is made of are not critical, provided the member is capable of performing this function. Thus, the member may be a hollow casing of any shape (e.g. a casing as described in Example 1), a solid rod, a grooved rod, an auger, or a metal beam. When a solid member is used, the reactive material can be added to the resulting void after the member is removed from the ground. When a hollow member is utilized, the reactive material can be added to the resulting void after the member is removed from the ground, or the reactive material can be added to the hollow portion of the member prior to removing it from the ground. Additionally, when a hollow member is used, it can conveniently be filled with a detachable conical point to facilitate installation. Preferably, the member is a hollow casing similar to that described in Example 1, however, casings of larger (e.g. about 25 to about 100 cm) or smaller (e.g. about 5 to about 25 cm) diameter can also be used.

The member can be inserted into the soil using any suitable means, such as driving, turning, vibrating, or a combination thereof. In sandy soils, the member is preferably inserted using vibro-installation, a technique that is well known in the construction field.

For a permeable treatment wall to function properly, a high proportion of the contaminated flow must pass through the reactive material. Accordingly, the permeable treatment wall should preferably have a higher hydraulic conductivity than the surrounding soil. It is possible that the insertion of one or more members into the ground according to the methods of the invention, may compact the surrounding soil and cause a decrease in permeability. Thus, it may be useful to decrease the soil density (e.g. increase the permeability) within or near the columns of the wall following placement of the reactive material. This can be performed using any technique that is known to be useful for decreasing soil density. For example, it can conveniently be carried out using deep soil mixing.

Additionally, it may be useful to decrease soil density in or near proposed column locations prior to inserting a member into the ground in order to facilitate insertion. As described in Example 1, the use of deep soil mixing prior to insertion of members resulted in a significant reduction in the time and effort required to construct the permeable treatment wall columns. Thus, the methods of the invention may optionally comprise reducing soil density at or near proposed column locations prior to inserting a member into the ground.

Because deep soil mixing can be used to increase the permeability of material in and near a permeable treatment wall, it may also be useful to increase the hydraulic conductivity of an existing permeable treatment wall. This is true regardless of how the wall was original constructed. Thus, deep soil mixing can be used to improve the capture capabilities of an existing wall, or to increase the flow rate through an existing wall, thereby reducing the time and expense required for remediation of a given area. Accordingly, the invention also provides a method comprising increasing the permeability of a permeable treatment wall (existing or newly constructed) by decreasing soil density in or near the wall using deep soil mixing.

The invention will now be illustrated by the following non-limiting Example.

EXAMPLE

Example 1

Installation of a Field Scale Permeable Treatment Wall Using Deep Soil Mixing Launch Complex 34 at NASA, Kennedy Space Center, Florida ("the site") has been used by NASA and its contractors since the early 1960s. Trichloroethylene was routinely used to flush Saturn rockets prior to launch, frequently resulting in the loss of trichloroethylene. Spills of other materials have occurred as well. The site has been the subject of contamination assessment and remedial investigation and is fairly well characterized. Analysis of the groundwater identified four volatile organic compounds: trichloroethylene, cis- and trans-dichloroethylene and vinyl chloride. Trichloroethylene concentrations range from non-detectable to about 310 mg/liter.

In February of 1998, a field-scale permeable treatment wall was installed at the site. In this installation, zero-valent iron was mixed with native soil using a deep soil mixing technique to form a permeable treatment wall. Initially, the design of the soil/iron columns was verified by computer simulation using the well-known groundwater and contaminant transport modeling programs, VISUAL MODFLOW® and MT3D96® (purchased from Waterloo Hydrogeologic Inc., Waterloo, Ontario, Canada).

Overview of Wall Construction

Deep soil mixing was used to construct iron/gravel/native soil columns to produce a permeable reactive wall. Prior to deep soil mixing, iron and gravel were introduced into the subsurface using hollow steel casings. A removable steel point on each steel casing ensured penetration and served as a plug for iron/gravel addition. The steel casings were installed within the dimensional limits of the deep soil mixer using a vibratory hammer. After the iron and gravel were added to the hollow casings, the steel points were pushed off and the casings were vibrationally removed leaving columns of iron and gravel. A deep soil mixer was then used to mix the iron and gravel with the native soil creating a permeable reactive column, having greater permeability than the surrounding soil.

Design & Modeling

Groundwater flow and contaminant transport were modeled using Visual MODFLOW® and MT3D96® computer executed software. Using computer simulations, wall spacing, permeability and pattern were altered in order to test different wall configurations.

The soil lithology at the site is characterized by silty sands with some shell. An initial geotechnical investigation of the site identified three general layers with hydraulic conductivity as listed in Table 2.

TABLE 2

Hydraulic conductivity of different soil layers

| Layer | Depth Below Ground Surface (m) | Hydraulic Conductivity (cm/sec) |
|---|---|---|
| 1 | 0 to 6.1 | $3.6 \times 10^{-4}$ |
| 2 | 6.1 to 9.1 | $2.0 \times 10^{-5}$ |
| 3 | 9.1 to 13 | $1.8 \times 10^{-6}$ |

The model was setup with this layered configuration as an unconfined aquifer extending from land surface to a confining unit 13 meters below land surface ("bls"). The hydraulic gradient at the site was determined from water table elevations and found to be in the range of $10^{-4}$ m/m. Since the wall was to be constructed using a 1.2-m diameter mixing auger, the model grid was refined into 1.2-m squares at the proposed wall location. Laboratory permeability tests were performed to determine the hydraulic conductivity of potential column mixture. The permeability of several mixtures was tested for use in the Visual MODFLOW® model. It was determined that a column to native soil permeability ratio of 50 would be ideal. Due to installation constraints and field scale-up, a permeability ratio of 20 to 30 was more realistic and was used in the design models.

Several wall configurations were selected for simulation. Two configurations used high permeable columns (pumpless wells) to focus the groundwater through the iron/gravel/soil mixture (Chopra, Manoj B., Reinhart D. R., Touati, R. and Quinn J., "Design of a Zero-Valent Metal Permeable Reactive Wall Using In Situ Mixing," Proceedings ofEnvironmental Engineering Conference, Edmonton, Canada, Jul. 22–26 (1997). Two used a continuous wall design. The maximum allowable spacing required to ensure the capture of the plume by the columns was determined by changing the spacing in a two-row wall. Center to center spacing of 4.88, 3.66, and 3.0 m were tested for plume capture. Both the 4.88 and 3.66-m spacing proved to be inadequate for capture. The 3.0-m spacing was determined to be appropriate for this design. As illustrated in FIGS. 2_a_–2_d_, additional designs were tested be altering wall layout, column permeability, and column spacing. The initial design consisted of two rows of 3.0-m-spaced columns. Another design tested was a three-row or W-shape wall. In this design, a third row was added by moving every other column in the first row to the third row. A single row layout consisting of adjacent columns and a single row of overlapping columns was also tested.

Figure 3:
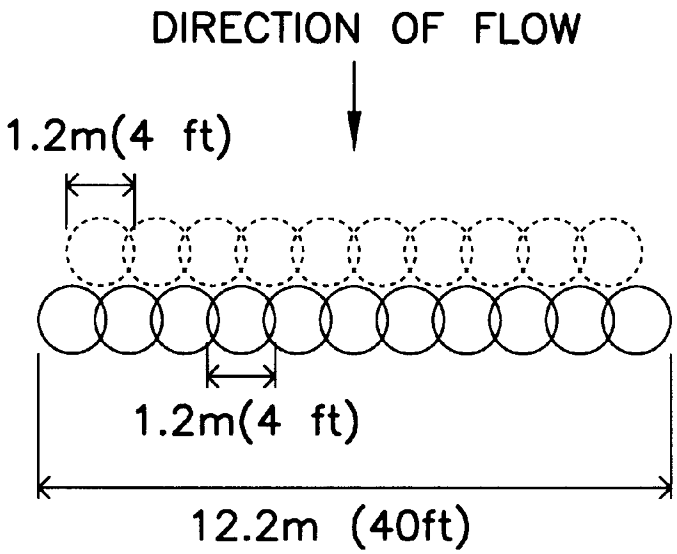
FIG. 3 illustrates the field-scale permeable treatment wall prepared in Example 1, wherein dashed circles indicate areas of deep soil mixing upstream from the permeable treatment columns, and solid circles indicate permeable treatment wall columns.

While the simulation for all four configuration shown in FIGS. 2_a_–2_d_ verified plume capture, the most conservative approach was selected to ensure complete treatment. As illustrated in FIG. 3, the final design consisted of 11 overlapping 1.2-m diameter columns for a total length of 12.2 m. Upstream of the wall, the soil was mixed by deep soil mixing to increase the permeability and promote flow through the wall. The two- and three-row designs are critically dependent on obtaining high soil permeability in the column in relation to the native soil. The overlapping design was selected over the adjacent arrangement to ensure wall continuity.

Treatment Efficiency The flow through a column can be determined by evaluating flow captured by the "pumpless well" using Darcy's Law, q—KiA, where $K=3.6\times10^{-4}$ cm/sec; $I=3\times10^{-4}$; $A=45\ m^2$, giving a flow rate of$3.9\times10^{-8}$ $m^3$/sec. Zero-valent metal treatment of chlorinated solvents has been found previously to follow first-order kinetics (Gillham, R. W., O'Hannesin, S. F., and Orth, W. S., "Metal Enhanced Abiotic Degradation of Halogenated Aliphatics: Laboratory Tests and Field Trials," Proceedings of Haz. Mat. Central Conf., Chicago, Ill. (1993)). Kinetic data have been collected using 1-m long, 10-cm diameter laboratory columns filled with a mixture of 20% by weight iron (Peerless Corp.), 40% by weight 20/30 sieve size sand, and 40% native soil (Reinhart, D. R., Clausen, C., Geiger, C., Ruiz, N., and Afioumy, G., "Enhancement if In Situ Zero-Valent Metal Treatment of Contaminated Groundwater," Proceedings of ASCE National Convention, Washington, D.C., Nov. 12–14 (1996)).

A first-order reaction constant of $2.18\times10^{-3}\ min^{-1}$ has been determined for trichloroethylene destruction. Detention time within each column can be determined from the pore volume divided by the captured flow rate. Assuming a porosity of 0.3, the 13-m deep, 1.2-m diameter columns will have pore volumes of 4.09 $m^3$. Consequently, hydraulic detention time within each column will be approximately 3.4 yrs. Using first-order kinetics, the required retention time to reduce trichloroethylene from 300 mg/l to 1 $\mu$g/l is 3.66 days. Thus, a considerable safety factor of approximately 300 is provided by the proposed wall.

Field Installation The wall was positioned in the field using survey flags and paint. Eleven column locations were painted on the ground. Inside each column, four 25-cm diameter-casing locations were identified with stakes. Two rods were positioned 3 m from either end of the wall, and were used as guideposts once the earth was disturbed. The distance from the guideposts to the center of each column and casing was measured.

Throughout the modeling period, the groundwater table averaged 1.2 to 1.5 m below the surface. Originally, the conceptual design included excavation of the soil within 30 cm of the water table to allow for soil volume increases during mixing. Due to El Niño conditions, the water table at the site during the construction effort was approximately 1 m bls. Therefore, only 0.5 m of soil was removed from the permeable treatment wall location.

Casing Installation

Construction commenced with vibro-installation of 44 hollow, 12.2 m long, 25 cm diameter steel casings. A 242-kW, crane-suspended vibratory hammer with a 36-metric ton suppressor was used to drive the hollow casings into the ground. The vibratory hammer utilized a modified, 25-cm diameter timber clamp to drive the steel pipe. A 77-metric ton crane with a 33.5-m boom and 20 m of leads was used to suspend the vibratory hammer and the deep soil mixing auger.

Prior to vibrating the casings into the subsurface, they were fitted with conical, steel points. Field-welds to the conical points were eventually required to minimize the surface contact between the casing and the steel point. However, several casings were initially driven into the ground and filled with an iron/gravel mixture using the original, slightly internally tapered points. The vibration activity created a tight fit between the casing and the point, and the subsurface release of the onical tip was difficult. The filled casing was then removed from the ground using he same vibratory hammer. Tabs were cut into the point using field-welding equipment, leaving only three contact points between the casing and the point. The casings were then re-driven into the ground and the points were popped from the casing without difficulty using a steel, 6-cm diameter Schedule-40 pipe. All future installations used the modified conical point. It may be preferable to use points without a taper to keep the casings from being driven into the points so far that it is difficult to get them to release in the sub-surface.

Iron/Gravel Addition

Each casing received either a mixture of iron and gravel, iron only, or gravel only. A concrete mixing truck was used to transport and load the iron and/or gravel into the casings. The iron used for construction was purchased from Peerless Metal Powders & Abrasives (Detroit, Mich.). The iron was shipped in 1360-kg bags that were hoisted into the air using a block truck. The pull-tab for the bags was then opened and the iron was directed into the concrete mixer's overhead loading funnel. Gravel (6.4-mm lime-rock) was also introduced into the mixer using the overhead funnel.

Initially, a mixture of iron and gravel was delivered to the site. However, larger loads did not funnel appropriate mixtures into the casings. The decision was then made to load casings full or either iron alone or gravel alone. This change decreased the amount of acid washing that would occur in the field since the gravel-only casings did not need any pre-treatment for the removal of corrosion by-products.

Seven of the 11 columns received in situ acid-washed iron prior to removing the casing. Laboratory testing had shown that a sulfuric acid bath with a pH of two could significantly improve the reaction kinetics of the iron. Therefore, in seven of the eleven columns, all casings with iron filings received an overnight acid wash prior to removal of the steel points from casings. Laboratory testing also indicated a rise in pH of the acid wash from two to five in the presence of iron filings as a result of the cleaning process. Therefore, the acid solution was released from the casing into the subsurface soils at a pH of five. High alkalinity levels at the site (257 mg/L as $CaCO_3$) probably maintained a neutral pH within the wall.

Deep Soil Mixing

Twenty-seven casings were installed within the eleven column locations prior to deep soil mixing. The first casings were initially driven to the 12.2-m depth within 35 minutes. As the wall site became more and more compacted, the casings required up to 1.5 hours to install. Thus, deep soil mixing was used to loosen up the compacted soils prior to installing the remaining casings of iron and gravel.

The deep soil mixing rig used at the site was ICE Model 55AT hydraulic top drive auger with roller guides. A 235-kW generator that applied 75 kN-m of torque powered the mixer. The auger blades were 15° off horizontal. Four teeth were located on each of the two mixing paddles. Four mixing blades were located above the mixing paddles and were not equipped with teeth. On the bottom of the auger were two "pilot teeth." The entire auger had a mixing diameter of 1.2 m.

Based on the results obtained with this deep soil mixer, it may be useful to use 40 inch Kelly bars without flanges and to add mixing blades above all flanges to prevent the mixer from getting stuck. Additionally, it may be useful to use tiger teeth instead of flat teeth when mixing.

Each of the eleven deep soil mixing columns received one initial mixing pass. A drilling fluid was required to ensure that the sandy soils did not collapse around the mixing blade and trap the auger at depth. Water was connected to the deep soil mixing column from a local fire hydrant and was jetted down through the center of the mixing auger. Only one column was completed using water as a mixing fluid. Because the groundwater table at the site was elevated, the construction site quickly became saturated to the surface and some flooding occurred. The remaining ten columns were mixed with air as the drilling fluid.

With the injection of air into the subsurface through the deep soil mixing rig, some volatilization of the contaminant occurred. This initiated continual breathing air quality monitoring at the site. Minor elevations in VOCs were detected directly above the mixing hole, but not within worker breathing zones. During deep soil mixing activities, high winds above the mixing hole worked favorably in dispersing any volatilization that occurred. Only momentary spikes were ever detected.

Figure 4:
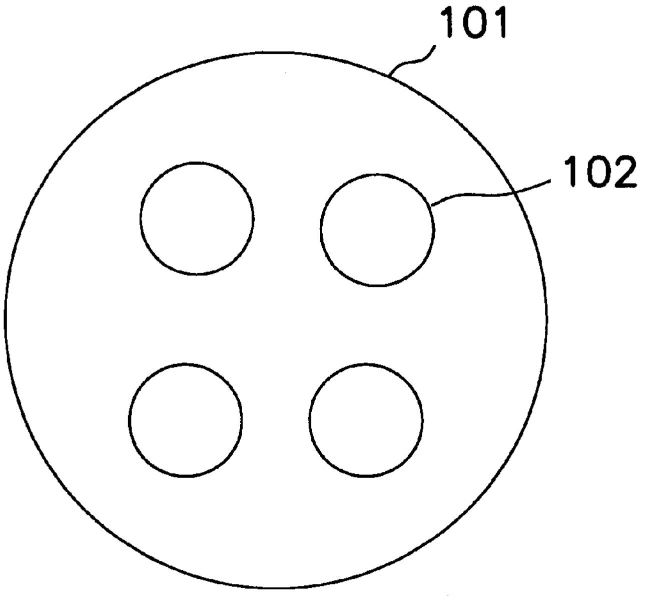
FIG. 4 illustrates a column during construction.

After completing one deep soil mixing pass, the remainder of the iron and gravel was added to the permeable treatment wall construction area. Deep soil mixing had so greatly decreased the density of the soil that the remaining seventeen casings were installed in less than 20 minutes per casing, with the majority of that time being consumed in the connection and disconnection from the hammer. Thus, considerable time can be saved by using deep soil mixing in the permeable treatment wall construction area prior to installing casings. As illustrated in FIG. 4, each final column 101 received three casings 102 of iron and one casing of gravel.

Eleven additional columns, located adjacent to and upstream of the reactive zone, were also mixed with a single pass of the deep soil mixing auger prior to evenly grading and sodding the site. There was no investigation-derived waste produced during the entire construction process and consequently there were no off site disposal costs. The final permeable treatment wall is illustrated in FIG. 3.

Conclusion

Deep soil mixing can be used to increase permeability in or near a permeable treatment wall. Thus, the construction of a permeable treatment wall using deep soil mixing offers several advantages over other permeable treatment wall construction techniques. The deep soil mixing technique produces little or no excavated soils that require special disposal; exposure of workers to hazardous chemicals is minimized since the mixing occurs below grade; and, as with other in situ remediation techniques, treatment equipment is unnecessary during regular operation. Additionally, the use of vibro-installation to facilitate the placement reactive materials in a permeable treatment wall also reduces the need for soil excavation and removal.

All publications, patents, and patent documents are incorporated by reference herein, as though individually incorporated by reference.

What is claimed is:

1. A method of constructing a permeable treatment wail made of one or more columns comprising: inserting a member into soil where a column is to be located, to create a void, wherein the member creates the void without substantial excavation of soil; placing a zero-valent metal, sand, gravel, or a mixture thereof into the void; and decreasing soil density in an area including the void to define the column after the zero-valent material has been placed in the void using deep soil mixing.

2. The method of claim 1 wherein the member is a hollow steel casing.

3. The method of claim 2 wherein the zero-valent metal, sand, or gravel, or a mixture thereof is placed in the hollow steel casing before the hollow steel casing is removed from the void.

4. The method of claim 1 wherein the member is removed to create a void before the zero-valent metal, sand, or gravel, or a mixture thereof is placed therein.

5. The method of claim 1 wherein the member is inserted using vibro-installation.

6. The method of claim 1 wherein the member is a hollow casing, a solid rod, a grooved rod, an auger, or a metal beam.

7. The method of claim 1 wherein the zero valent metal is iron.

8. The method of claim 1 wherein deep soil mixing is used to decrease soil density in or near where a column is to be located prior to inserting the member into the soil.

9. The method of claim 1 wherein the permeable treatment wall comprises a plurality of columns.

10. The method of claim 1 further comprising modeling column number, shape, size, spacing, permeability, or how much zero-valent metal, sand, or gravel is necessary to provide effective groundwater decontamination prior to constructing the wall.

11. The method of claim 1, wherein inserting the member includes:

forming the void using a vibration tool.

12. A ground water treatment system comprising: a plurality of permeable treatment columns vertically extending into the ground, the columns comprising a zero-valent metal, sand, or gravel, or a mixture thereof, wherein the columns are formed by a member inserted into the soil to create a void into which the zero-valent metal, sand, or gravel, or a mixture thereof is inserted to form the column, the void being formed by the member without substantial excavation of soil, wherein the volume of each column is defined by deep soil mixing after the zero-valent metal has been placed in the void.

13. The ground water treatment system of claim 12, wherein the columns are laterally spaced apart from each other.

14. A method of constructing a permeable treatment wall made of one or more columns comprising: inserting a member into soil where a column is to be located, to create a void, wherein the member creates the void without substantial excavation of soil; placing a reactive material into the void; and deep soil mixing the reactive material with the soil after the reactive material has been placed in the void.

15. The method of claim 14, wherein the member is a hollow steel casing with an end cap, the end cap vibrating the soil to form the void.

16. The method of claim 14, further comprising:

deep soil mixing the soil where the column is to be located prior to inserting the member into the soil.

17. The method of claim 14, wherein the deep soil mixing increases the permeability of the column.

* * * * *